United States Patent [19]

McCarty

[11] Patent Number: 4,857,749
[45] Date of Patent: Aug. 15, 1989

[54] APPARATUS AND METHOD FOR MEASURING THE SPACING BETWEEN THE CORDS OF A FABRIC

[75] Inventor: John R. McCarty, Akron, Ohio

[73] Assignee: The Firestone Tire & Rubber Company, Akron, Ohio

[21] Appl. No.: 141,232

[22] Filed: Jan. 6, 1988

[51] Int. Cl.[4] ..................... G01N 21/86; G01N 21/89
[52] U.S. Cl. .................................. 250/571; 356/429; 356/431
[58] Field of Search ............... 250/571, 559, 561, 563, 250/572; 73/146; 356/431, 429, 238, 242

[56] References Cited

U.S. PATENT DOCUMENTS

| | | |
|---|---|---|
| 3,511,293 | 5/1970 | Matthews . |
| 3,648,164 | 3/1972 | Searle . |
| 3,847,485 | 11/1974 | Zanoni . |
| 3,852,600 | 12/1974 | Faulkner . |
| 3,918,816 | 11/1975 | Foster . |
| 4,004,693 | 1/1977 | Tsuji . |
| 4,015,651 | 4/1977 | Witt . |
| 4,124,300 | 11/1978 | Mead et al. ...................... 250/571 |
| 4,277,178 | 7/1981 | Cushing et al. .................. 250/559 |
| 4,475,815 | 10/1984 | Takasu . |

FOREIGN PATENT DOCUMENTS

0228147 4/1986 European Pat. Off. .
0239689 4/1986 European Pat. Off. .

Primary Examiner—Edward P. Westin
Attorney, Agent, or Firm—Ernst H. Ruf

[57] ABSTRACT

An apparatus and method for measuring the distance between center lines in pairs of cords located in a web of cords. A laser beam passes through an expander which enlarges the beam. The enlarged beam is directed by mirrors to a prism and cylindrical lens through a cube beam splitter to form a line of light. The prism, cylindrical lens and beam splitter are mounted in a carriage. The carriage moves along a track which is orthogonal to the cords in the fabric, with the fabric either being stationary or moving with respect to the track. The line of light is directed against the cords by a lens and the reflected light is collected by the cube beam splitter and converted by an electronic detector into a wave form, amplified and has its apex detected by an analog picking circuit. A train of short pulses is generated, the apexes of which correspond to the center lines of the cords. The cord spacing measurment is determined from the elapsed time between cord center lines multiplied by the scan velocity of the moving carriage.

23 Claims, 5 Drawing Sheets

APPARATUS AND METHOD FOR MEASURING THE SPACING BETWEEN THE CORDS OF A FABRIC

TECHNICAL FIELD

The invention relates to an apparatus and method for measuring the spacing between the cords of a fabric including a calendered fabric having a rubber coating. More particularly the invention relates to an apparatus and method for measuring the distance between the center lines of a pair of cords, the overall width of the web, and the number of cords in the web by the use of reflective light with the web either being stationary or moving.

BACKGROUND ART

In the manufacture of tires, cord-reinforced fabric is an important element of the final manufactured tire. Production of the cord-reinforced fabric is usually performed in a continuous manufacturing procedure and it is desirable to achieve the most satisfactory and efficient tire, that the individual cords of the fabric be uniformly spaced and lie in a parallel relationship with respect to each other. Usually the cord fabric is ultimately calendered, that is bonded within a layer of rubber for subsequent fabrication of the final tire. It is desirable that the manufacturing process of the cord fabric, either calendered or uncalendered, be within specified limits, and that during the manufacturing, adjustments can be made to the process to correct deviations from the desired parameters. Such adjustments prevent a considerable amount of fabric from being produced before the corrections can be made resulting in an imperfect fabric and/or resulting scrap.

The use of light, including scanning laser beams, has been used to measure numerous properties of woven textiles. Photodetectors measure both transmitted light which has penetrated the fabric and reflective light to quantitatively assess fabric on such attributes as cord diameter, presence of globs of fibers, missing cords, weave density, weft angle and other fabric and cord characteristics. In certain of these prior methods a digital computer has been used to analyze the detector signals and issue reports on fabric inspected at a speed up to 30" per second. However, such prior art systems are very costly and complex. Other known systems use line scanned CCD arrays often having up to 1024 elements. If, for example, a lens is selected to image a width of three inches of 33 end/in. fabric, the resolution would be 0.003 inches. Since the cord-to-cord spacing is 0.033 this means the measurement uncertainty is 10%. If it is important to know the total number of cords in certain applications, it would be necessary to develop the facility to positively register the entrance of each cord into the field of view as well as the exit of each cord from the field of view during the scanning. Such computer programming and system components also are considerably complicated and expensive for most cord production fabrication and manufacturing facilities.

Other methods and apparatus for determining the spacing between cords in a fabric or other characteristics of types of fabrics and/or components used in the manufacture of tires are set forth in the following patents:

U.S. Pat. No. 3,511,293 discloses a method of analyzing a tire by x-ray in which the plies are formed of an essentially weftless fabric comprising a plurality of parallel cords bonded together by a coating of rubber. An x-ray photograph of the crown portion of the tire will reveal the bias angle that the respective cords make with the circumference about the crown. Tracer cords are positioned in one of the plies so that after the tire is cured the x-ray picture of the tire will indicate any change in distance between the two cords to determine whether the cords positioned below the tread portion of the tire are loose or tight.

U.S Pat. No. 3,648,164 discloses an apparatus for detecting variations in the spacing of a plurality of conductive strands which are imbedded within a rubber or plastic layer. The apparatus includes a transmitter for transmitting microwave radiation in the direction normal to the tire's sidewall. A crystal detector and horn receiver is positioned within the tire and as the tire side wall is moved between the transmitter and receiver, differences in cord spacing along the side wall give rise to readings on the receiver.

U.S. Pat. No. 3,847,485 discloses a device which is adapted to measure on a point-to-point basis the distance on a test surface from a predetermined reference plane. The apparatus includes a light source, such as a laser, which provides optical energy for a collimated beam which oscillates along an optical synthetic axis. A part of the beam passes through a beam splitter and is transmitted and focused by lens onto the front surface of a mirror. The beam then enters a second beam splitter and is focused by a lens for projecting onto a surface being measured. The mirror oscillates at a fixed frequency and the position of the lens is directly related to the test surface.

U.S. Pat. No. 3,852,600 discloses a plurality of x-ray detectors positioned precisely with respect to the center line of a tread stock in order to detect mislocation of steel reinforcements, belts, chafer strips and bead bundles by subjecting uncured rubber layers to x-ray radiation. The intensity of the x-rays passing through the tire section is measured and thus is capable of sensing the relative location of the reinforcements within the tire.

U.S. Pat. No. 3,918,816 discloses a method and apparatus for dimensional inspection of a tire. The apparatus includes dynamic measurements for determining structural imbalance as well as determining surface contour and profile for tread wear purposes. The apparatus uses a small laser beam which impinges upon the surface to obtain positional data relating to the surface. The laser is mounted on a laser scanning mechanism which is controlled by a motor and has a position monitor.

U.S. Pat. No. 4,004,693 discloses an apparatus for inspecting the disposition of reinforcing steel ply cords in pneumatic tires. The apparatus includes a conveyor for feeding tires to an entry mechanism and a radial cord distribution detection mechanism is mounted between a pair of beams. The mechanism is slideably movable along guide rods and when the detector passes over the steel ply cords a weak voltage is produced and is amplified. An output signal determines the cord distribution in the tire.

U.S. Pat. No. 4,015,651 discloses a tire cord coating system which uses x-ray analysis to count the number of regular cords between a pair of specially prepared spirally wrapped steel cords.

U.S. Pat. No. 4,475,815 discloses a method and apparatus for measuring the width of a selvage rubber portion. A parallel light is emitted from a light source such as a halogen lamp, and the intensity distribution of light reflected by a transfer roller and coating sheet is detected by a photodetector. The angle formed by the light emitted by the light source along a plane perpendicular to the axial line of the transferring roller is set within a predetermined range and the photodetector is arranged to receive scattered light from the transfer roller. The intensity of incident light to the light receiving elements correspond to the position of various cords in the strip being measured.

European Patent Application No. 0 228 147 discloses a system for determining the bias weight of cord reinforced tire fabric which uses two radiation sources. One of the sources determines the fractional area of the fabric not containing steel cords while the other is used to measure the average attenuation of radiation passing through the fabric. Both sources and their corresponding sensors are movably mounted on a pair of beams which extend across the width of the fabric web. The source sensor assemblies continuously scan across the fabric width so that information from the entire fabric area is obtained.

European Patent Application No. 0 239 689 discloses a system for measuring the open space between, and the ratio of open space to cord diameter, of cord reinforced tire fabric. An x-ray source and detector scan across the tire fabric as it is calendered providing a signal corresponding to each edge of a cord. A counter provides a time interval measurement of each open space as the x-ray source and detector scans the fabric.

Although certain of these prior art systems and apparatus do provide a means for measuring the spacing and/or location of cords within a fabric, the method and apparatus do not achieve the results and advantages of my invention in such a relatively simple, efficient and inexpensive manner as described below and as set forth in the appended claims.

DISCLOSURE OF THE INVENTION

An object of the invention is to provide a method and apparatus for measuring the spacing between the cords of a fabric by measuring the distance between the center lines of pairs of cords located in a web of cords having any desired width; and in which the number of cords in each web is measured as well as the overall width of the web and the spacing between the radial centerlines of the cords within the web.

Another object of the invention is to provide such an apparatus which directs a laser beam at the cords contained in a web at a predetermined angle; and in which the beam is directed via a beam spliter, a lens and a mirror or prism. A further objective is to provide such an apparatus in which the laser beam is formed into a line of light to avoid the variations in reflected light which results when a fine spot is scanned over twisted cords; and in which the beam of light is expanded by passing the laser beam through a beam expander prior to directing it by mirrors to a moving carriage containing a lens and beam splitter for ultimately forming the expanded beam of light into the line of light and then directing the line of light transversely across the parallel cords as the carriage is moved across the cords on a track by a motor-driven belt.

Another objective of the invention is to provide such an improved apparatus and method in which the cord spacing measurement is determined from the elapsed time between cord center lines multiplied by the scan velocity of the carriage moving across the cord; and in which the beam is capable of scanning the fabric, irrespective of whether the fabric is at rest or moving transversely beneath the moving carriage.

Still another objective is to provide such an improved apparatus and method in which the expanded beam of light is directed by the mirrors and lens and then formed into a line of light and then directed at a predetermined angle against the fabric whereby the reflected light is scattered at all positions where it strikes the cord, but is reflected most efficiently where the beam falls on the center line of each cord; and in which the collected light is converted into a wave form derived from the reflected light which is amplified and has its apex detected by an analog peak picking circuit which generates a train of short pulses which correspond to the center lines of the cords, which pulses can then be analyzed to determine the cord center lines.

A still another objective of the invention is to provide such an improved method and apparatus in which the laser beam is directed at each cord at precisely the same geometry; in which the beam can be directed either perpendicularly from the moving carriage against the cord fabric or up to and including an angle of approximately 45 degrees; and in which the laser which produces the light source can be mounted either stationary with respect to the moving carriage or can be mounted on the carriage without affecting the concept of the invention.

A further objective of the invention is to provide such an improved method and apparatus which can be used to detect the spacing between the cord center lines on either a calendered or uncalendered strip of fabric, or on a strip of fabric which is either moving or stationary; and in which the detecting mechanism can be mounted above or below a horizontal strip of fabric, or the fabric can be moving vertically with respect to the moving carriage.

A still another objective of the invention is to provide such an improved apparatus and method which can be carried out in a relatively inexpensive manner than heretofore believed possible with other types of cord detecting mechanisms; and which the apparatus and method enables a visual output to be produced nearly simultaneously after a moving strip of fabric has passed the detection mechanism enabling the operation and parameters of a calendering or fabric production line to be altered to compensate for any irregularities detected in the fabric strip by the improved apparatus and method of the invention.

These objectives and advantages are obtained by the improved apparatus of the invention, the general nature of which may be stated as a source of radiant energy; a carriage mounted for linear movement across the fabric transverse to the running direction of the cords; focusing means mounted on the carriage for focusing at least a portion of the radiant energy against the fabric as the carriage moves across said fabric; collecting means mounted on the carriage for collecting at least a portion of the radiant energy reflected from said fabric; and means for calculating the spacing between the cords by the relationship between the intensity of the reflected radiant energy and the speed of the carriage moving across the fabric.

The objectives and advantages are obtained further by the improved method of the invention for measuring the spacing between the individual cords of a piece of fabric in which a plurality of cords are arranged in a generally spaced relationship, the general nature of which may be stated as including the steps of, projecting light onto the piece of fabric at a predetermined angle; moving the light transversely across the fabric generally transverse to the parallel running direction of the cords; collecting at least a portion of the light reflected from the fabric; measuring the transverse speed of the light moving across the fabric; and calculating the spacing between the individual cords by the relationship between the intensity of the collected reflected light and transverse speed of the light moving across the fabric.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
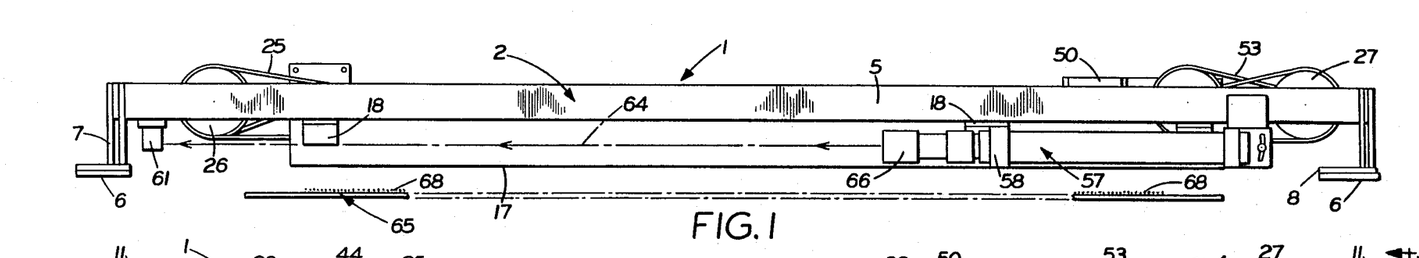
FIG. 1 is a generally diagrammatic side elevational view of a portion of the improved apparatus of the invention with a part of a strip of fabric being located beneath the moving carriage of the apparatus.
Figure 2:
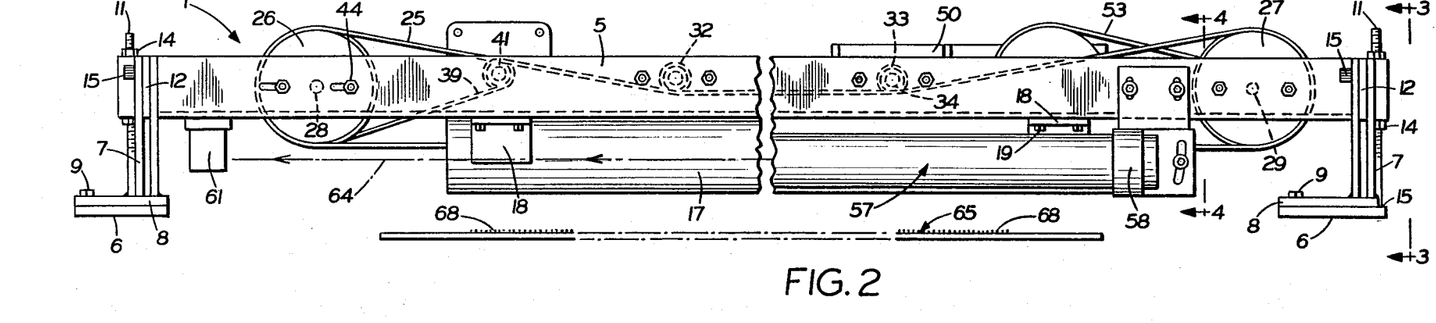
FIG. 2 is an enlarged fragmentary side elevational view of the apparatus as shown in FIG. 1.
Figure 3:
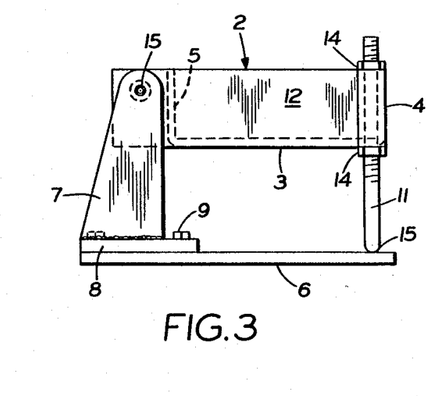
FIG. 3 is an enlarged end elevational view looking in the direction of arrows 3—3, FIG. 2.
Figures 4, 5:
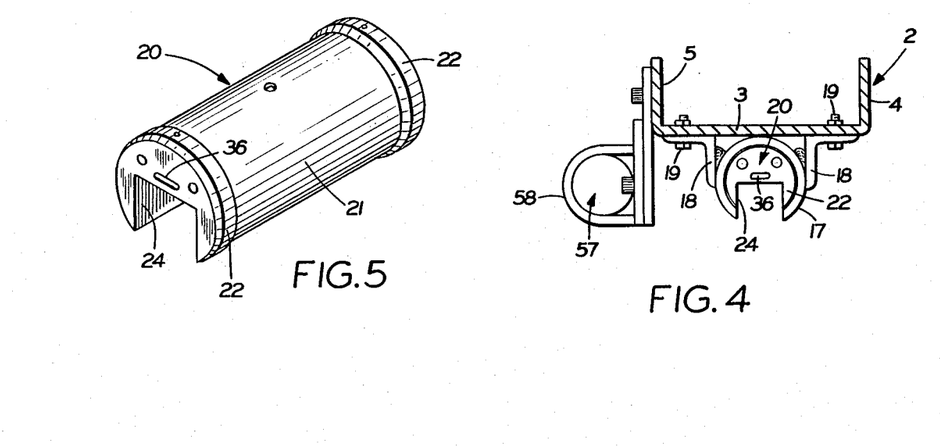
FIG. 4 is a sectional view taken on line 4—4, FIG. 2 with the optical and electrical components removed therefrom.
FIG. 5 is a perspective view of the carriage component of the improved apparatus with the optical and electrical components removed therefrom as in FIG. 4.
Figure 6:
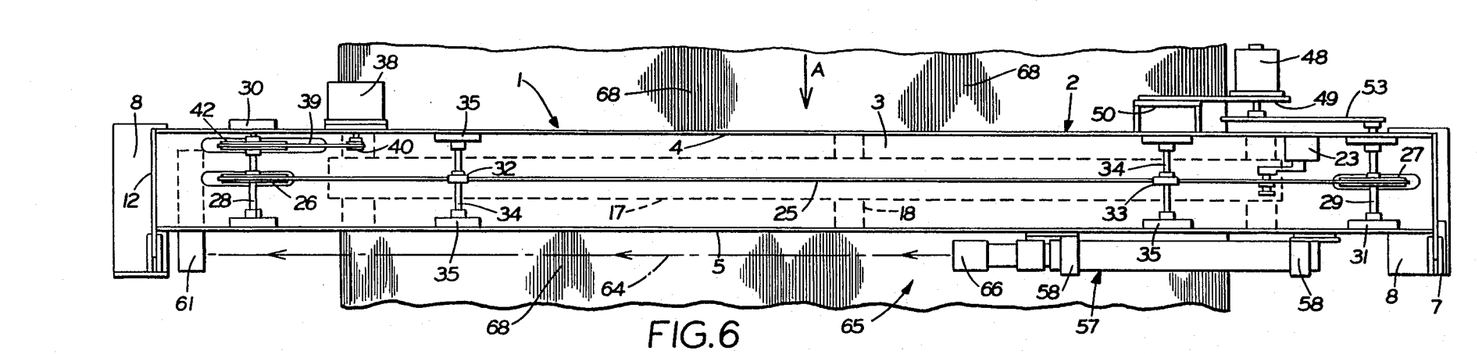
FIG. 6 is a generally diagrammatic top plan view of the improved apparatus of FIGS. 1 and 2 with a strip of fabric being shown located below.
Figure 7:
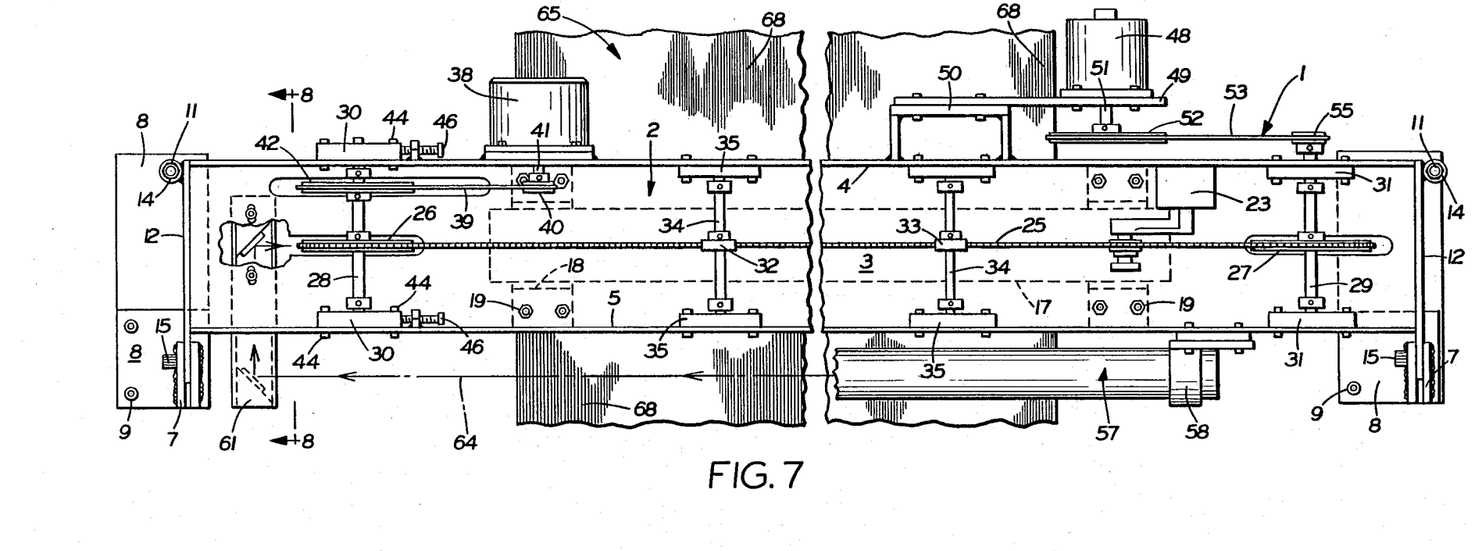
FIG. 7 is an enlarged fragmentary view with portions broken away and in section similar to that of FIG. 6, showing additional features of the improved apparatus.

The improved apparatus of the invention is indicated generally at 1 and is shown particularly in FIGS. 1-9. The apparatus includes a main U-shaped track indicated generally at 2, having a web wall 3 and a pair of flange walls 4 and 5 (FIG. 4).

Track 2 is supported on a pair of end plates 6 by a pair of upstanding brackets 7, each of which is mounted on a base 8 attached to plate 6 by a plurality of bolts 9 (FIG. 3). A threaded rod 11 preferably is mounted at each end of track 2 by an end plate 12 for the purpose of vertically adjusting track 2. A pair of nuts 14 vertically adjusts rod 11 whereby with its lower end 15 abutting plate 6 will vertically adjust track 2 due to the pivotal mounting of the opposite end of end plate 12 on a pin 15 mounted between the spaced ends of upstanding brackets 7. A generally circular-shaped guide tube 17 (FIG. 4) is mounted on the bottom of track web wall 3 by a plurality of L-shaped brackets 18 and bolts 19. Tube 17 extends generally beneath and along the longitudinal length of track 2.

A carriage indicated generally at 20 (FIG. 5), is slideably mounted within guide tube 17 for movement therealong as described in greater detail below. Carriage 20 includes a generally cylindrical body 21 and a pair of end collars 22 having a diameter complementary to the inside surface of guide tube 17 to provide a smooth sliding engagement therebetween. A generally U-shaped cutout 24 is formed throughout much of cylindrical body 21 for the housing of various optical components and an electrical detector as described in greater detail below.

The drive mechanism for carriage 20 includes a timing belt 25 which extends generally throughout the length of track 2. Belt 25 extends about a pair of end pulleys 26 and 27 which are attached to a pair of shafts 28 and 29, respectively, which are rotatably journaled in individually spaced pairs of bearings 30 and 31, which are bolted to flange walls 4 and 5 of U-shaped track 2.

A pair of intermediate stabilizing sprockets 32 and 33 are each attached to a shaft 34 which is rotatably journaled in spaced end bearings 35 also mounted on flange walls 4 and 5 of track 2. Timing belt 25 passes through a passage 36 (FIG. 5) formed in carriage body 21 and is secured thereto, whereby movement of timing belt 25 will slide carriage 20 along guide tube 17. A belt tensioning unit 23 is mounted on flange wall 4 and engages belt 25 to maintain a predetermined tension thereon.

A carriage drive motor 38 (FIG. 7) is attached to flange wall 4 of track 2 and is drivingly connected by a drive belt 39 to shaft 28 by a pulley 40 which is mounted on motor output shaft 41 and a larger pulley 42 mounted on the outer end of shaft 28.

Bearings 30 are adjustably mounted on side walls 4 and 5 by a pair of bolts 44 whereby the position of shaft 28 is adjustable by threaded bolts 46. Rotation of bolts 46 will move bearings 30 and attached shaft 28 along the track side walls to provide the desired amount of tension on motor drive belt 39. Furthermore, adjustment bolts 46 will ensure that shaft 28 is properly aligned transverse to the longitudinal axis of track 2.

A position indexer 48 (FIGS. 6 and 7) is mounted on a plate 49 which is offset from track flange wall 4 by a U-shaped mounting bracket 50. Indexer shaft 51 has a pulley 52 mounted thereon which is drivingly connected to an endless belt 53 also trained about a smaller pulley 55 which is mounted on an outward extended end of shaft 29.

A laser indicated generally at 57, is mounted by a pair of brackets 58 to one side of track 2. A pair of mirrors 59 and 60 (FIGS. 8 and 9) are mounted on a bracket 61 to the bottom of web wall 3 of track 2 by bolts 62 for directing a beam of light indicated at 64, toward carriage 20 for subsequent direction against a strip of fabric, indicated at 65, located below U shaped track 2. If desired, laser 57 could be mounted in other positions, and by use of additional mirrors, could direct the light beam in different patterns and paths toward carriage 20 than that shown in the drawings without affecting the concept of the invention. A beam expander 66 is mounted on the end of laser 57 (FIG. 6) whereby the beam of light or radiant energy emitted by laser 57 is changed from a relatively small collimated or cylinder of light, for example a diameter of 0.7 mm to a larger cylinder, such as one having a diameter of 7.0 mm, which is represented by arrow path 64.

Figures 8, 9, 10:
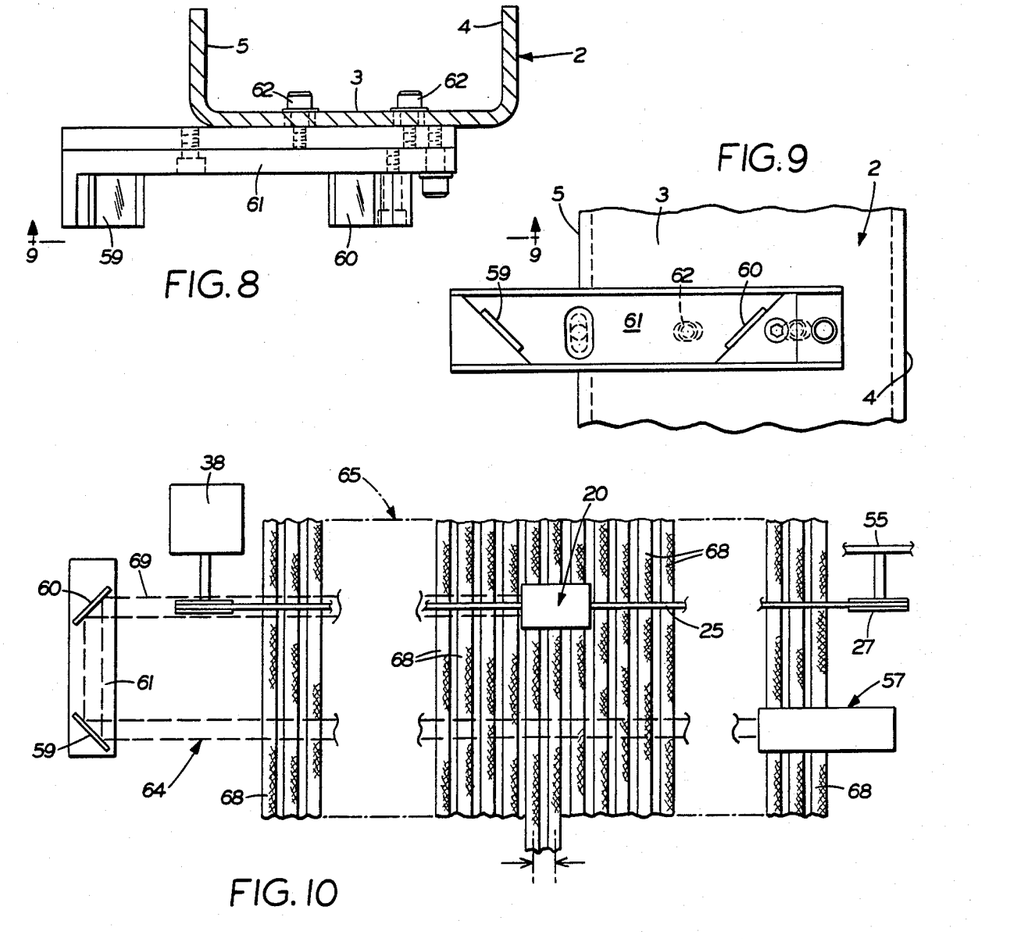
FIG. 8 is a sectional view taken on line 8—8, FIG. 7.
FIG. 9 is a fragmentary end elevational view looking in the direction of arrows 9—9, FIG. 8.
FIG. 10 is a greatly enlarged diagrammatic view showing part of the individual cords of a fabric and the movement of the beam of light with respect thereto.
Figure 11:
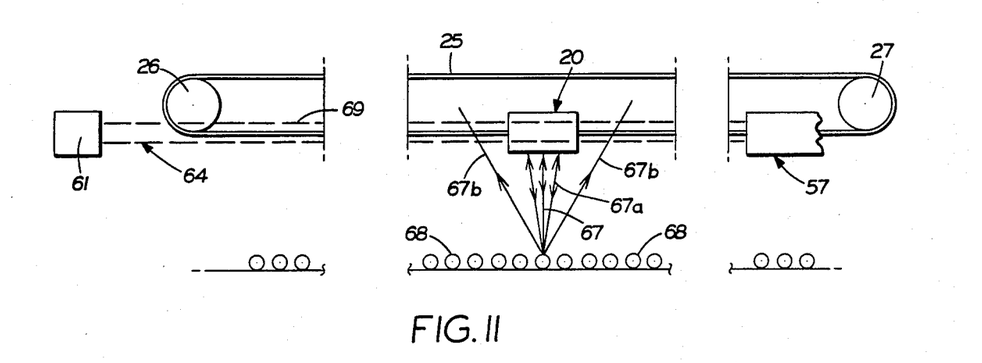
FIG. 11 is a fragmentary diagrammatic elevational view of FIG. 10.

A piece of fabric indicated generally at 65, which is of a type intended for a tire carcass, includes a plurality of cords 68, which preferably are arranged in a true parallel spaced relationship with respect to each other as shown diagrammatically in FIG. 10. Fabric 65 preferably will be moving transversely, preferably orthogonally, beneath track 2 as indicated by arrow A (FIG. 6) during a usual detection procedure. Light beam 64, which is shown as a spaced double dash line in FIG. 10 to illustrate an expanded beam of light, after leaving expander 67 of laser 57, is directed by mirrors 59 and 60 along a path 69 which coincides with the longitudinal path of travel of carriage 20. This beam of light is then transmitted downwardly toward the fabric as indicated at 67 in FIG. 11, and a portion of the light 67a reflected therefrom is collected by an assembly of electric and optical components indicated generally at 70, which is mounted within cutout 24 of carriage 20, with another portion of the reflected light 67b being lost.

Figures 12, 13, 14, 15, 16:
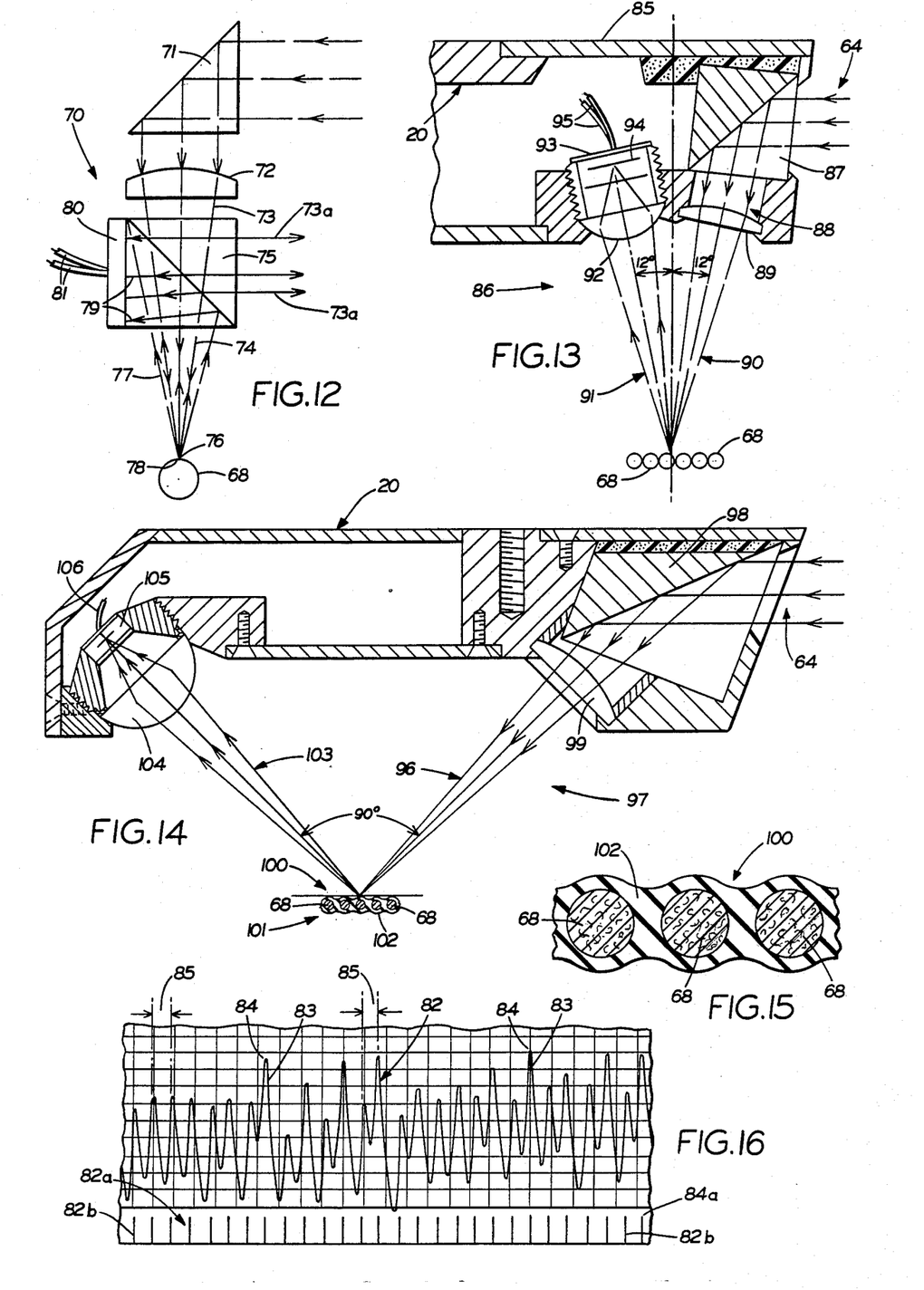
FIG. 12 is an enlarged diagrammatic view showing one form of the optical components including a prism, cylindrical lens, cube beam splitter and electrical detector collecting apparatus for mounting within the movable carriage of FIGS. 4 and 5.
FIG. 13 is a diagrammatic view showing another arrangement using a prism, cylindrical lens at an angle to the vertical and an aspheric lens and electrical detector at an equal angle to the vertical, mounted in the movable carriage for directing the beam of light against individual cords and collecting the light reflected therefrom.
FIG. 14 is a further modified optical system similar conceptually to FIG. 13 for directing the beam of light against the cords of a calendered fabric.
FIG. 15 is a greatly enlarged view of a calendered fabric with individual cords being contained therein.
FIG. 16 is a diagrammatic view showing the pulse train output of the detected signal showing the center line spacings of the individual cords.

One type of electrical/optical assembly for directing the light beam toward the fabric and collecting a portion of the light reflected therefrom is shown in FIG. 12 and indicated generally at 70. Assembly 70 consists of a prism 71 or mirror which directs the incoming beam through a cylindrical lens 72 oriented to produce a very sharp line of light 73 which, for example, in the preferred embodiment is approximately 7 millimeters in length, and which is parallel to warp cords 68 located below. The beam of light 73 preferably passes through a cube beam splitter 75 which transmits approximately 50% of the light and reflects approximately 50% of the light at a right angle where it is ultimately lost as indicated at 73a. The remaining light beam indicated at 74 leaves the surface of cube beam splitter 75, enters the atmosphere and focuses on the plane of the cord as a line 76.

The reflected light 77 is scattered at all of those positions where it strikes the cords 68, and is reflected most efficiently when the beam falls on the center line of the cord indicated at 78. The reflected light 77 reenters cube beam splitter 75 and 50% of the collected light 79 is directed into an electrical detector 80 and 50% passes through and is lost. Other beam splitter and lens arrangements may be used without affecting the concept of the invention. Several such additional embodiments are shown in detail in FIGS. 13 and 14 and are described below.

Reflected collected light 79 produces an electrical signal in detector 80 which is transmitted through conductors 81 to a computer (not shown) preferably located adjacent apparatus 1. The electrical signal is an analog wave form of the reflected light as indicated generally at 82 as shown in FIG. 16. When the signal is operated upon by equipment well known in the art, the result will be a pulse train as shown at 82A in FIG. 16. Prior to forming pulse train 82A the reflected light will be amplified and its apexes 84 detected by an analog peak picking circuit, which equipment also is well known in the art and, therefore, is not shown in detail. The resulting pulse train consists of a plurality of short pulses 82B with the apexes 84A thereof corresponding to the cord center lines 78. Thus, the spacings 85, several of which are shown in FIG. 16, which are the distances between the apexes of the pulses, show the spacing of the center lies 78 of the various cords and the location of the individual cords 68 along the fabric.

Figure 17:
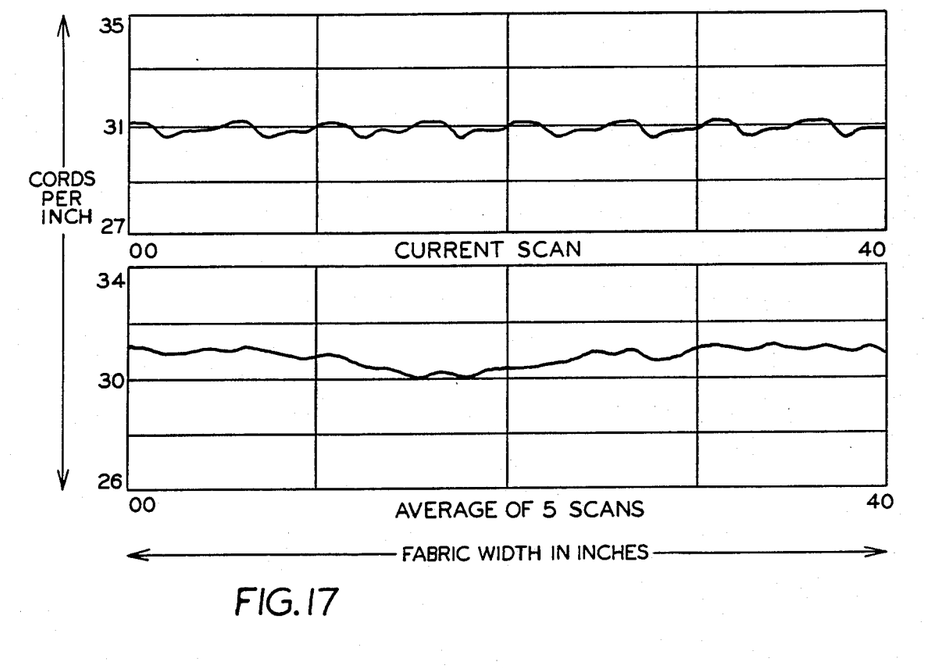
FIG. 17 is a graphic display of the current scan and average of the past five scans provided by the improved apparatus of the invention.

A more complete measurement cycle is described as follows. A digital computer is programmed to start the mechanical scan by accelerating the movement of carriage 20 by drive motor 38 and timing belt 25, and at the same time will start a 32 bit counter which counts 1 mhz crystal controlled frequency. As each pulse 84A is detected the reading of the counter is transferred to memory. When the full scan width of the fabric has been traversed by carriage 20, the drive motor 38 is stopped. The time corresponding to the center line of the first cord is substracted from that corresponding to the center line of the last cord and multiplied by the velocity of moving carriage 20. To this is added the width of one cord to yield the width of the fabric. Each earlier time is subtracted from the adjacent time and multiplied by the velocity to yield an array of cord spacing distances. The count of cords is readily derived from the final array. The graphic display, such as shown in FIG. 17, informs an operator of the fabric process line of all deviations from uniform spacing of the cords, enabling the operator to take appropriate action for controlling the speed, location, centering, etc. of the incoming cords so that the final spacing thereof in the fabric, is generally parallel and an equal distance from all other cords. For example the graphic display of FIG. 17 provides the operator with a graph of the most recent scan of the carriage as well as the average of the previous five scans in terms of cords per inch in relationship to the total fabric width preferably in inches.

As a result of the scanning geometry, the required cord spacing measurement is derived directly from the elapsed time between cord center lines, multiplied by the scan velocity, which will generally be a constant, but can be varied for higher possible scan rates. The line of light returns clean pulses as the beam scans the fabric whether the fabric is moving or stationary. A spot of light works adequately, but only on a rapidly moving fabric. Therefore, it is desirable for the beam of light from the laser to be expanded into a line of light for the most satisfactory results. In the particular type of laser, such as an HeNe laser of the type which may be used in the present invention, the beam normally emerges at a diameter of about 0.7 mm and is expanded to produce an expanded beam of approximately 7 mm diameter. This is long enough to exceed the twist helical spacing. It is the variable angles of the surface within the helical spacing which prevents the spot from working on a stationary fabric.

A modified electric/optical package or assembly is indicated at 86 and is shown in FIG. 13. Assembly 86 is mounted in a supporting structure 85, which in turn is mounted in cutout 24 of carriage 20. In this arrangement incoming expanded beam 64 passes through a prism 87 which directs it to a cylindrical lens 89 which causes the beam of light to converge as a line at the top plane of the cords. The reflected light 91 passes through another lens 92 which converges it into an electric photodetector 93 precisely on its sensitive surface 94. The resulting electrical signal is then transmitted by conductors 95 to the computer or other associated electronic circuitry. In the electrical/optical package 86 the incoming downwardly directed light beam 90 and reflected light beams 91 form an included angle of approximately 24 degrees as shown in FIG. 13.

A still further modified form of an electrical/optical package or assembly is indicated generally at 97, and is shown in FIG. 14. In assembly 97 the incoming light beam 64 is redirected by a prism 98 and passes through a lens 99 which converges the light into a beam 96 which is directed downwardly toward a calendered strip of fabric indicated generally at 101 (FIG. 14) where it is reflected off of an outer surface 100 thereof. Fabric 101 has a rubber coating or encapsulation 102 applied to the spaced cords 68A. The reflected light 103 is collected, and in particular the higher intensity reflected light which is caused by the center line of the cord is collected, which is then passed through an aspheric lens 104 and then to a photodetector 105. The electrical signals which are produced by detector 105 are transmitted by conductors 106 to the computer or other control circuitry. In the electrical/optical package 97 the incoming and reflected waves preferably form a 90 degrees included angle which has been found satisfactory, especially for calendered fabric.

The particular arrangement of the optical components as shown in FIG. 14 has been found to be more suitable for use with calendered fabric than the arrangement shown in modified assemblies of FIGS. 12 and 13, which preferably are used in measuring the spacing between cords in an uncalendered fabric. With either type of optical package or assembly, the resulting output is a graphical display as shown in FIG. 17. This graphic output is the result of the calculations described above and represents the spacing between the cords and their location throughout the length of the fabric to enable an operator to adjust any control parameters during the manufacturing process of the cord material, whether calendered or uncalendered.

Thus, the improved apparatus and method of the invention provides a means for rapidly determining the status of the individual cords, and in particular the spacing thereof and location, in the overall length of fabric as the fabric is moving in production. This enables the operator to take corrective steps to eliminate any problems or irregularities starting to form in the fabric, resulting in a considerable savings of heretofore scrapped lengths of fabric. Also the measurements can be made on the fabric, whether stationary or moving, by moving carriage 20 transversely across the parallel cords. Thus, the improved apparatus and method disclose the use of a laser beam which is directed across the individual cords in the web of cords with precisely the same geometry to accurately measure the spacings between the cord center lines, discloses the use of a line of light to avoid wide variations of reflected light which results when a fine spot of light is scanned across stationary fabric, and in which the particular arrangement of the laser beam splitter and mirrors provide results not believed shown, suggested or obvious in the view of all known prior art.

Accordingly, the apparatus and method for measuring the spacing between the cords of a web of fabric provide an effective, safe, inexpensive, and efficient device and method which achieve all the enumerated objectives, provide for eliminating difficulties encountered with prior devices and methods, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved apparatus and method for measuring the spacing between the cords of a web of fabric is constructed and used, the characteristics of the construction, and the advantageous, new and useful results obtained; the new and useful structures, devices, elements, arrangements, parts, combinations, and method steps, are set forth in the appended claims.

What is claimed is:

1. An apparatus for measuring the spacings between individual cords in a fabric containing a plurality of said cords arranged in a generally parallel relationship; said apparatus including:
   (a) a source of radiant energy;
   (b) a carriage mounted for linear movement across the fabric transverse to the running direction of the cords;
   (c) focusing means mounted on the carriage for focusing at least a portion of the radiant energy against the fabric as the carriage means moves across said fabric;
   (d) collecting means mounted on the carriage for collecting at least a portion of the radiant energy reflected from said fabric; and
   (e) means for calculating the spacing between the cords by the relationship between the intensity of the reflected radiant energy and speed of the carriage moving across the fabric.

2. The apparatus defined in claim 1 in which the source of radiant energy is a laser which emits a beam of light.

3. The apparatus defined in claim 2 in which the laser is mounted in a stationary position; and in which a plurality of mirrors direct the beam of light from the laser to the fabric.

4. The apparatus defined in claim 3 in which a cube beam splitter is mounted on the carriage and directs only a portion of the light against the fabric.

5. The apparatus defined in claim 4 in which said cube beam splitter directs only a portion of the reflected light to the collecting means.

6. The apparatus defined in claim 1 in which the collecting means is an electrical photodetector.

7. The apparatus defined in claim 1 in which the focusing means includes a beam splitter and a lens.

8. The apparatus defined in claim 1 in which the carriage is mounted on a timing belt; in which said timing belt is driven by a drive motor; and in which a position indexer is operatively connected to the timing belt to measure the position of the carriage as it moves across the fabric.

9. The apparatus defined in claim 8 in which the carriage is slidably supported in a track; and in which the track is spaced from a strip of the moving fabric.

10. The apparatus defined in claim 1 in which the fabric is a calendered fabric.

11. The apparatus defined in claim 10 in which the radiant energy is a beam of light; and in which the collection means collects light reflected from the calendered fabric at an angle of approximately 90 degrees with respect to the beam of light focused against the fabric.

12. The apparatus defined in claim 2 in which the beam of light is directed perpendicularly against the fabric.

13. A method for measuring the spacings between the individual cords of a piece of fabric in which a plurality of cords are arranged in a generally spaced parallel relationship, including the steps of:
(a) generating a beam of light from a source of radiant energy;
(b) moving a carriage across the fabric generally transverse to the parallel direction of the cords;
(c) projecting the beam of light from the carriage onto the fabric at a predetermined angle as the carriage moves across the fabric;
(d) collecting at least a portion of the light reflected from the fabric by a detector mounted on the carriage as the carriage moves across the fabric;
(e) measuring the transverse speed of the light moving across the fabric; and
(f) calculating the spacing between the individual cords by the relationship between the intensity of the collected reflected light and transverse speed of the light moving across the fabric.

14. The method defined in claim 13 including the step of moving the strip of fabric generally transverse to the direction of travel of the carriage as the carriage moves across the fabric.

15. The method defined in claim 13 including the steps of, expanding and directing by mirrors said beam of light and forming it into a line of light in the plane of the strip of fabric, and directing said line of light against the strip of fabric.

16. The method defined in claim 15 including the step of splitting the line of light before directing it against the strip of fabric; and splitting the light reflected from said fabric before collecting said light to calculate the spacing between the cords.

17. The method defined in claim 15 including the step of directing the light against the fabric at an angle within the general range of 45 degrees and 90 degrees.

18. The method defined in claim 13 including the step of generating a graphic display of the calculated spacing between the cords.

19. The method defined in claim 13 including the steps of mounting a laser in a fixed position with respect to the strip of fabric for generating the light; and directing the beam of light by mirrors towards a lens mounted on a carriage.

20. The method defined in claim 19 including the step of splitting the light reflected from the fabric before being gathered by the electrical detector.

21. The method defined in claim 19 including timing the speed of the carriage as it moves across the fabric to measure the position of said carriage.

22. The method defined in claim 13 in which the fabric is a calendered fabric with the cords being contained within a rubber coating.

23. A method for measuring the spacings between the individual cords of a piece of fabric in which a plurality of cords are arranged in a generally spaced parallel relationship, including the steps of:
(a) mounting a laser in a fixed position with respect to the strip of fabric for generating a beam of light;
(b) directing the beam of light by mirrors towards a lens mounted on a carriage;
(c) moving the carriage generally transversely across the parallel cords;
(d) projecting the light onto the piece of fabric at a predetermined angle as the carriage moves across the cords;
(e) collecting at least a portion of the light reflected from the fabric by an electrical detector mounted on the carriage as the carriage moves across the fabric;
(f) measuring the transverse speed of the light moving across the fabric; and
(g) calculating the spacing between the individual cords by the relationship between the intensity of the collected reflected light and transverse speed of the light moving across the fabric.

* * * * *